United States Patent
Nakazawa et al.

(10) Patent No.: US 8,955,895 B2
(45) Date of Patent: Feb. 17, 2015

(54) INTERIOR MATERIAL MOUNTING STRUCTURE

(75) Inventors: Yoshizumi Nakazawa, Shizuoka (JP); Tomochika Ueda, Shizuoka (JP)

(73) Assignee: Suzuki Motor Corporation, Shizuoka (JP)

( * ) Notice: Subject to any disclaimer, the term of this patent is extended or adjusted under 35 U.S.C. 154(b) by 0 days.

(21) Appl. No.: 13/334,252

(22) Filed: Dec. 22, 2011

(65) Prior Publication Data

US 2012/0161460 A1 Jun. 28, 2012

(30) Foreign Application Priority Data

Dec. 27, 2010 (JP) .................................. 2010-290826

(51) Int. Cl.
*B60R 13/02* (2006.01)
(52) U.S. Cl.
CPC ......... *B60R 13/0206* (2013.01); *B60R 13/0212* (2013.01); *B60R 13/025* (2013.01); *B60R 2013/0293* (2013.01)
USPC ...................................................... 296/1.08
(58) Field of Classification Search
CPC .. B60R 13/02; B60R 13/025; B60R 13/0206; B60R 13/0212; B60R 2013/0293
USPC ...................................................... 296/1.08
See application file for complete search history.

(56) References Cited

U.S. PATENT DOCUMENTS

| | | | |
|---|---|---|---|
| 7,172,211 B2* | 2/2007 | Hirose | 280/730.2 |
| 7,404,576 B2* | 7/2008 | Lizak | 280/743.2 |
| 7,621,556 B2* | 11/2009 | Itakura | 280/728.2 |
| 2003/0178822 A1 | 9/2003 | Yamamura et al. | |
| 2006/0220357 A1 | 10/2006 | Lizak | |

FOREIGN PATENT DOCUMENTS

| | | |
|---|---|---|
| GB | 2 283 375 a | 5/1995 |
| JP | 61-27114 A | 12/1986 |
| JP | 61-271148 A | 12/1986 |
| JP | 11-34755 A | 2/1999 |
| JP | 11-98658 A | 4/1999 |

OTHER PUBLICATIONS

Japanese Office Action dated Sep. 26, 2014, which issued during prosecution of Japanese Application No. 2010-290826, which corresponds to the present application.
European Search Report issued in application No. 11195072.1 issued on Apr. 2, 2012.

* cited by examiner

*Primary Examiner* — Glenn Dayoan
*Assistant Examiner* — Melissa A Black
(74) *Attorney, Agent, or Firm* — Troutman Sanders LLP

(57) ABSTRACT

A roof lining and a front pillar trim are mounted on a roof panel and a front pillar inner panel respectively, an end portion of the roof lining and an end portion of the front pillar trim are connected to each other, a washer hose feeder line and a tether belt are disposed from a space between the front pillar trim and the front pillar inner panel to a space between the roof lining and the roof panel, a projecting piece projecting toward the roof panel or the front pillar inner panel is provided on the end portion of at least one interior material out of the roof lining and the front pillar trim, and the washer hose feeder line and the tether belt are disposed to keep clear of the projecting piece.

5 Claims, 6 Drawing Sheets

INTERIOR MATERIAL MOUNTING STRUCTURE

CROSS-REFERENCE TO RELATED APPLICATION

This application is based upon and claims the benefit of priority of the prior Japanese Patent Application No, 2010-290826, filed on Dec. 27, 2010, the entire contents of which are incorporated herein by reference.

BACKGROUND OF THE INVENTION

1. Field of the Invention

The present invention relates to an interior material, mounting structure. More particularly, the present invention relates to an interior material mounting structure having: a car body panel; an upper interior material and a lower interior material mounted on the car body panel, with their end portions being connected to each other; and a rope-like body disposed from a space between the upper interior material and the car body panel to a space between the lower interior material and the car body panel.

2. Description of the Related Art

Some automobile is provided with a car body panel, and an upper interior material and a lower interior material mounted on the car body panel. An end portion of the upper interior material and an end portion of the lower interior material are connected to each other.

In such an interior material mounting structure, various kinds of rope-like bodies such as drain hose are sometimes disposed from a space between the lower interior material and the car body panel to a space between the upper interior material and the car body panel.

When the end portion of the upper interior material or the end portion of the lower interior material rides on the rope-like bodies, a gap occurs at a parting portion between the end portion of the upper interior material and the end portion of the lower interior material, which has a problem of impairing outer appearance of the parting portion.

Therefore, there have conventionally been used a structure to form a plurality of restricting pieces restricting arrangement paths of rope-like bodies over a long range and a structure to form paths of rope-like bodies in the interior materials as disclosed in Patent Document 1 and Patent Document 2.

[Patent Document 1] Japanese Laid-open Patent Publication No. 11-34755

[Patent Document 2] Japanese Laid-open Patent Publication No. 11-98658

However, according to the above-described conventional structures, because of a need to form the plural restricting pieces or the paths of the rope-like bodies, the structure of shaping molds of the interior materials are complicated, causing an increase in cost of the shaping molds.

SUMMARY OF THE INVENTION

The present invention was made in consideration of the above circumstances and has an object to provide an interior material mounting structure capable of improving outer appearance of a parting portion between an end portion of an upper interior material and an end portion of a lower interior material, and simplifying shaping molds of the interior materials to reduce manufacturing cost of the shaping molds.

In order to solve the aforesaid problem, the present invention is an interior material mounting structure in which an upper interior material and a lower interior material are mounted on a car body panel, an end portion of the upper interior material and an end portion of the lower interior material are connected to each other, and a rope-like body is disposed from a space between the lower interior material and the car body panel to a space between the upper interior material and the car body panel, the structure including a projecting piece provided on the end portion of at least one interior material out of the upper interior material and the lower interior material to project toward the car body panel, wherein the rope-like body is disposed to keep clear of the projecting piece.

In the present invention, the projecting piece is provided on the end portion of the upper interior material, and a clip hole for a clip fixing the end portion of the lower interior material to the car body panel is formed in the car body panel below the projecting piece.

In the present invention, a projection end portion of the projecting piece abuts on the car body panel.

In the present invention, a convex portion formed on the projecting piece is fitted in a concave portion formed in the car body panel.

In the present invention, the upper interior material is a roof lining, the lower interior material is a front pillar trim, and the rope-like body is a tether belt of a head protection airbag.

DETAILED DESCRIPTION OF THE PREFERRED EMBODIMENTS

Hereinafter, an embodiment of the present invention will be described based on the drawings.

Figure 1:
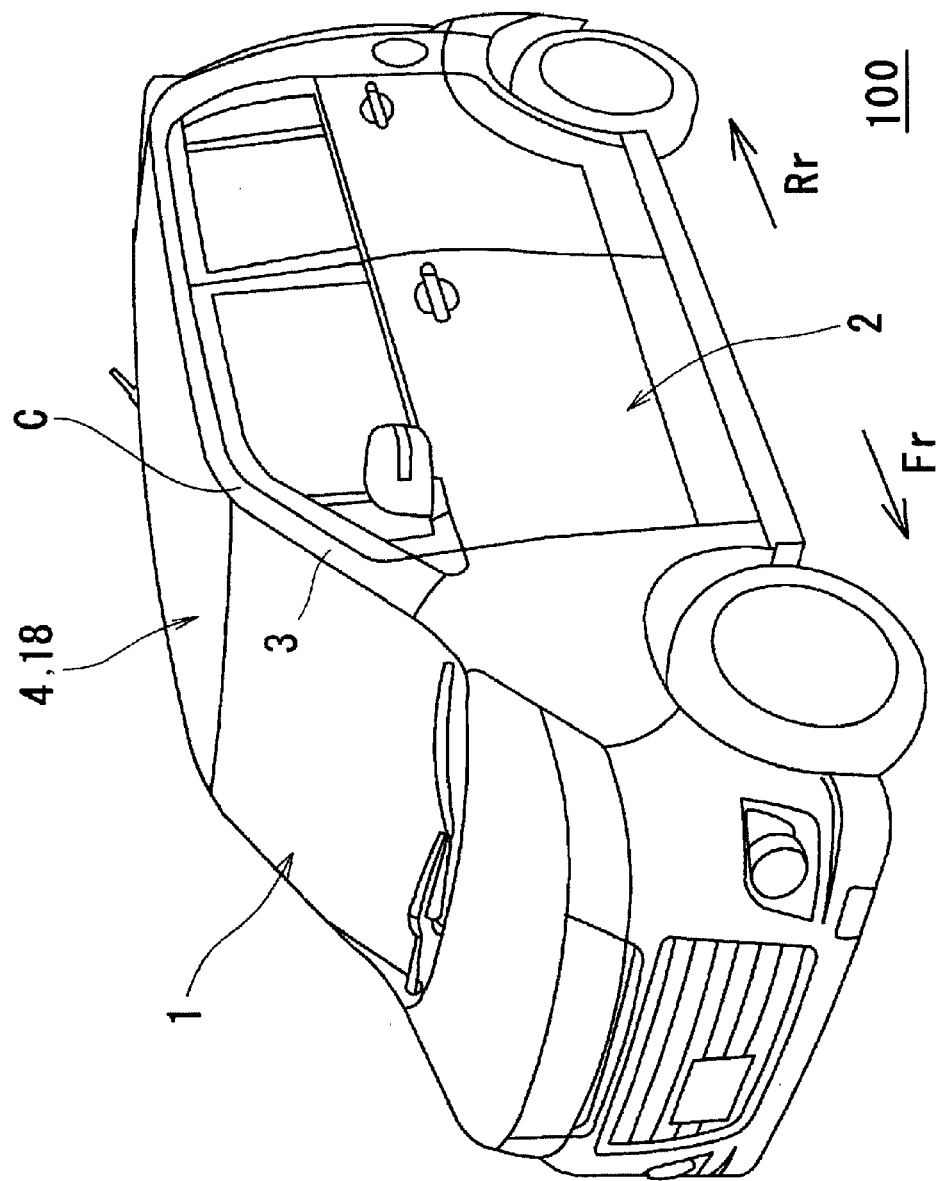
FIG. 1 is a perspective view of a car.
Figure 2:
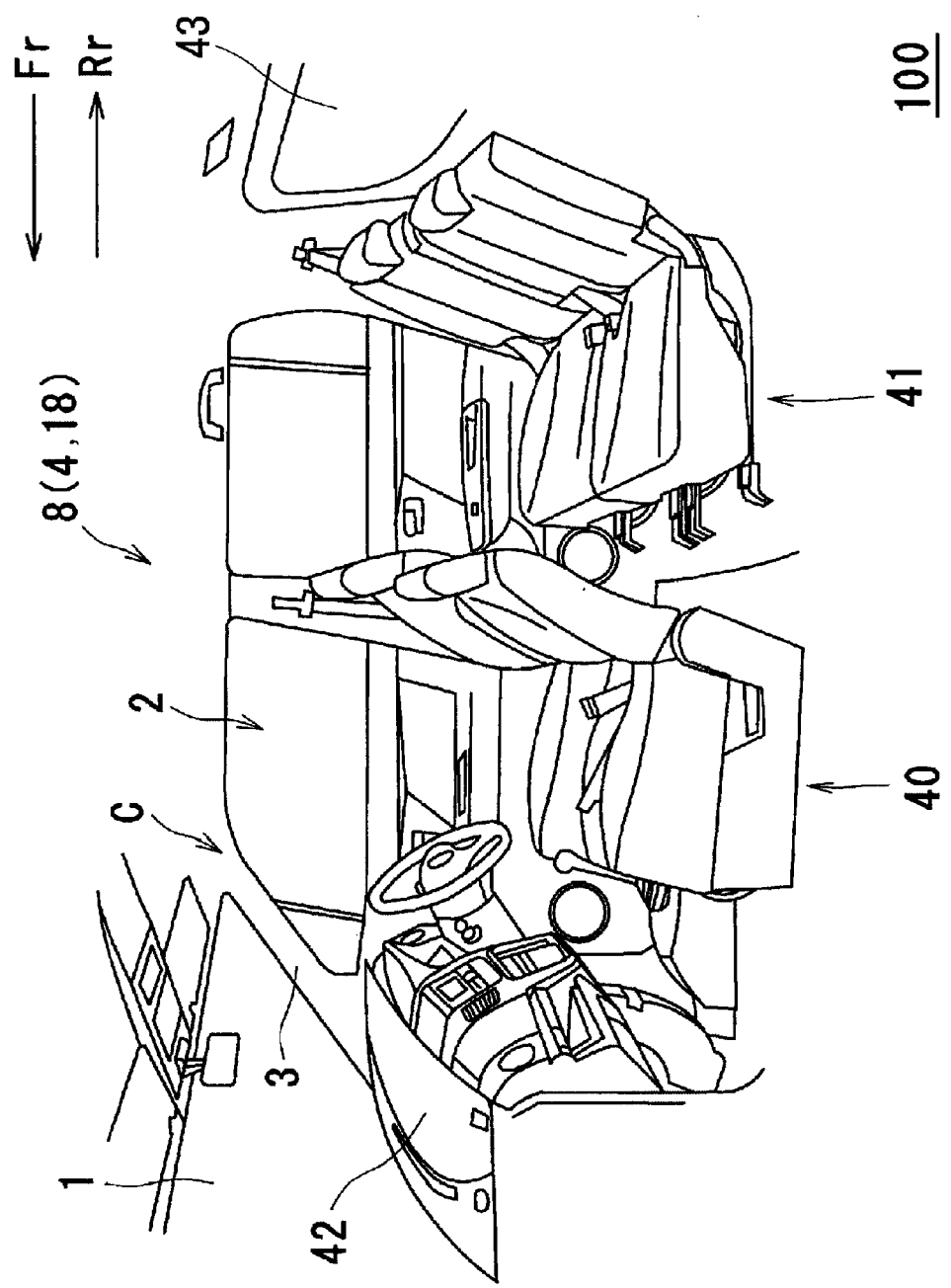
FIG. 2 is a perspective view of the inside of a cabin of the car.

As illustrated in FIG. 1 and FIG. 2, a front pillar 3 is disposed between a front window glass 1 and a front door 2 of a car 100. An upper end portion of the front pillar 3 is connected to a front corner C of a roof 4. In FIG. 2, 42 denotes an instrument panel, 40 denotes a front seat, and 41 denotes a rear seat.

Figure 3:
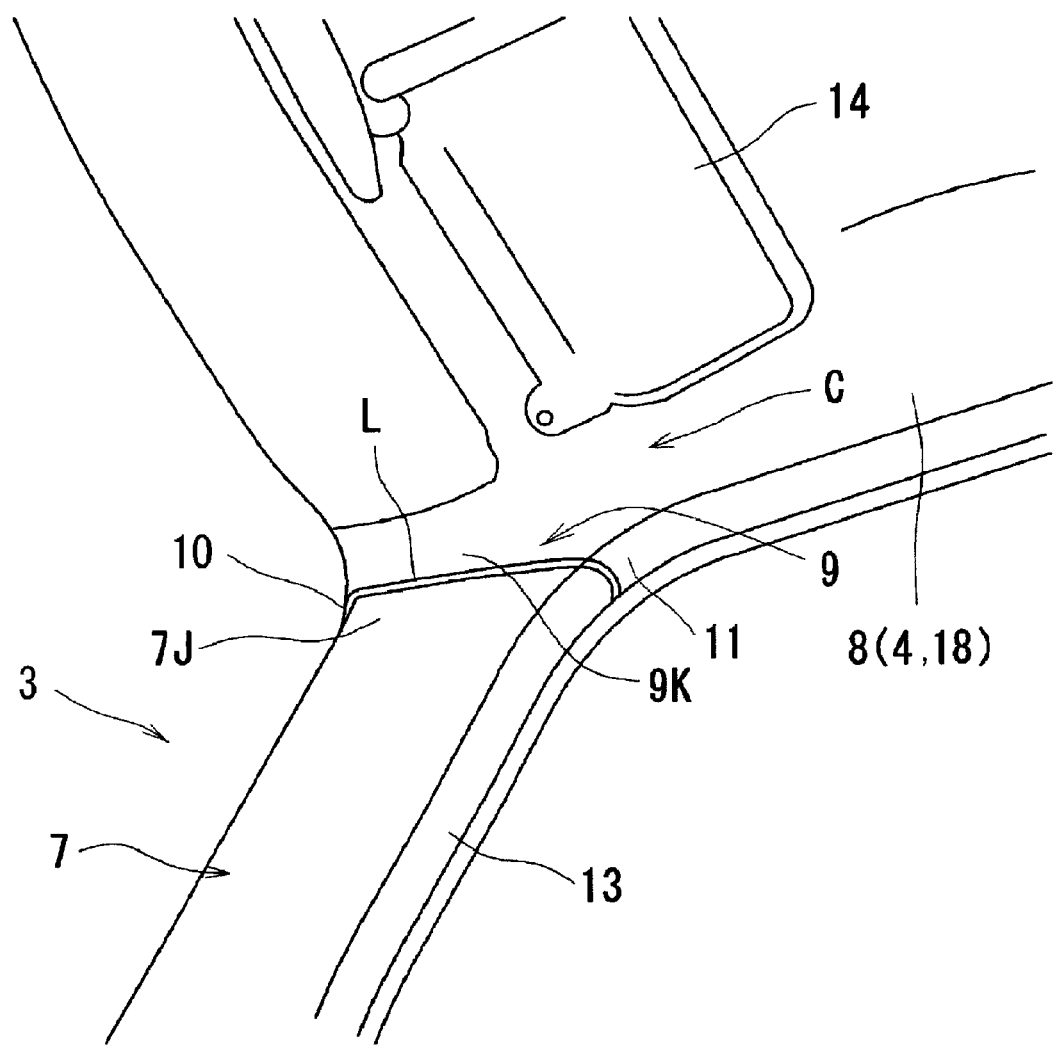
FIG. 3 is a perspective view illustrating a connection part between a roof lining and a front pillar trim.
Figure 4:
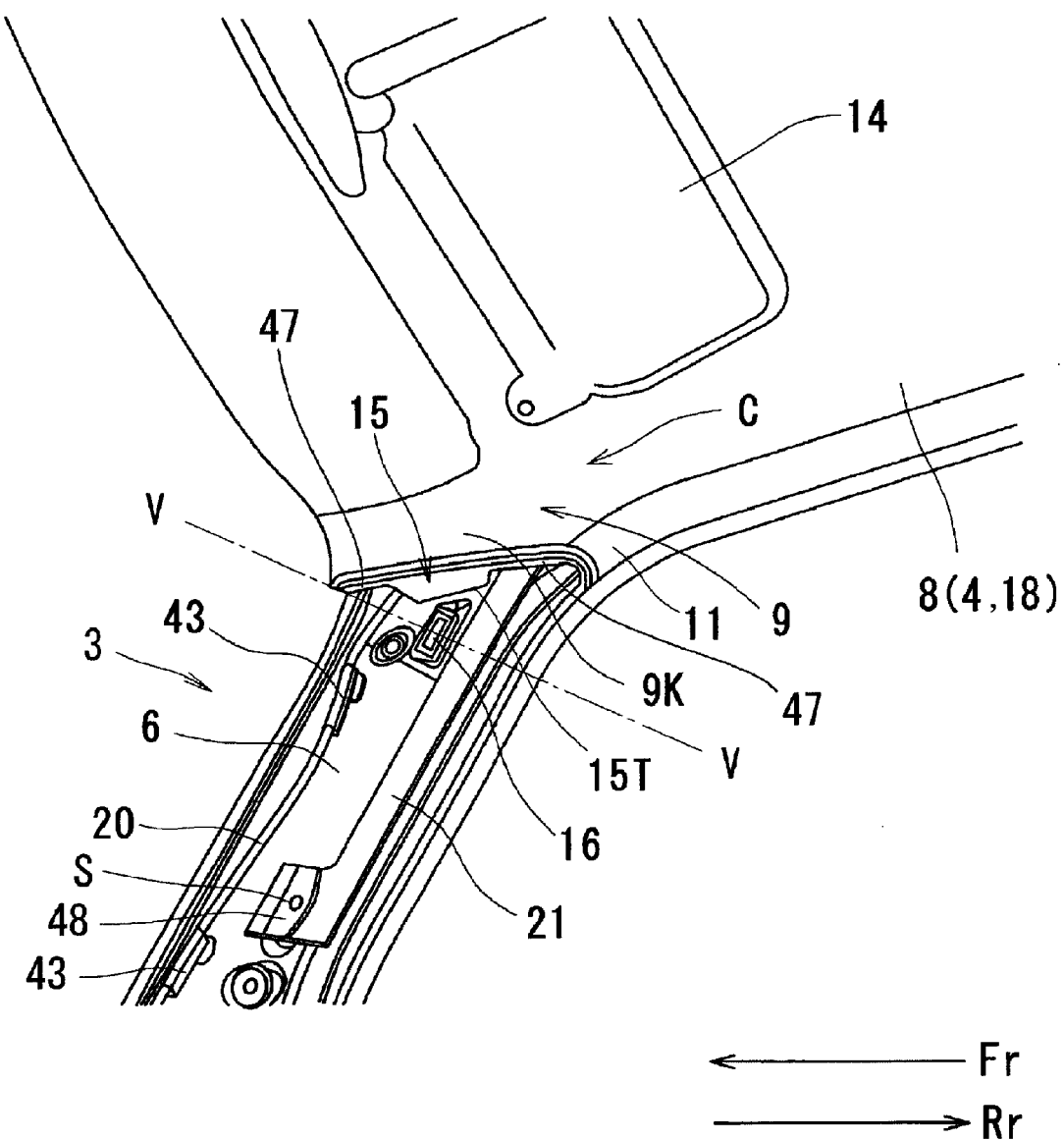
FIG. 4 is a perspective view of a front pillar, with a front pillar trim being removed.

As illustrated in FIG. 3 and FIG. 4, the front pillar 3 includes: a front pillar inner panel 6 corresponding to a car body panel; and a front pillar trim 7 of resin corresponding to a lower interior material. The front pillar trim 7 is mounted on the front pillar inner panel 6 to cover a surface, of the front pillar inner panel 6, on a cabin inner side. The roof 4 includes a roof panel 18 corresponding to the car body panel and a roof lining 8 of resin corresponding to an upper interior material. The roof lining 8 is mounted on the roof panel 18 to cover the roof panel 18.

The roof lining 8 is formed in a rectangular shape which is long in a front and rear direction of the car 100 in a top view. From the front corner C of the roof lining 8, a connection part 9 connected to the front pillar trim 7 extends downward. Both side portions of the connection part 9 in terms of the front and rear direction of the car 100 are bent toward the outside of the cabin. Bent portions are a front sidewall 10 and a rear sidewall 11. That is, the front sidewall 10 and the rear sidewall 11 (see FIG. 3 and FIG. 4) are formed on the connection part 9. A sun visor 14 is mounted on a front end portion of the roof 4.

Figure 5:
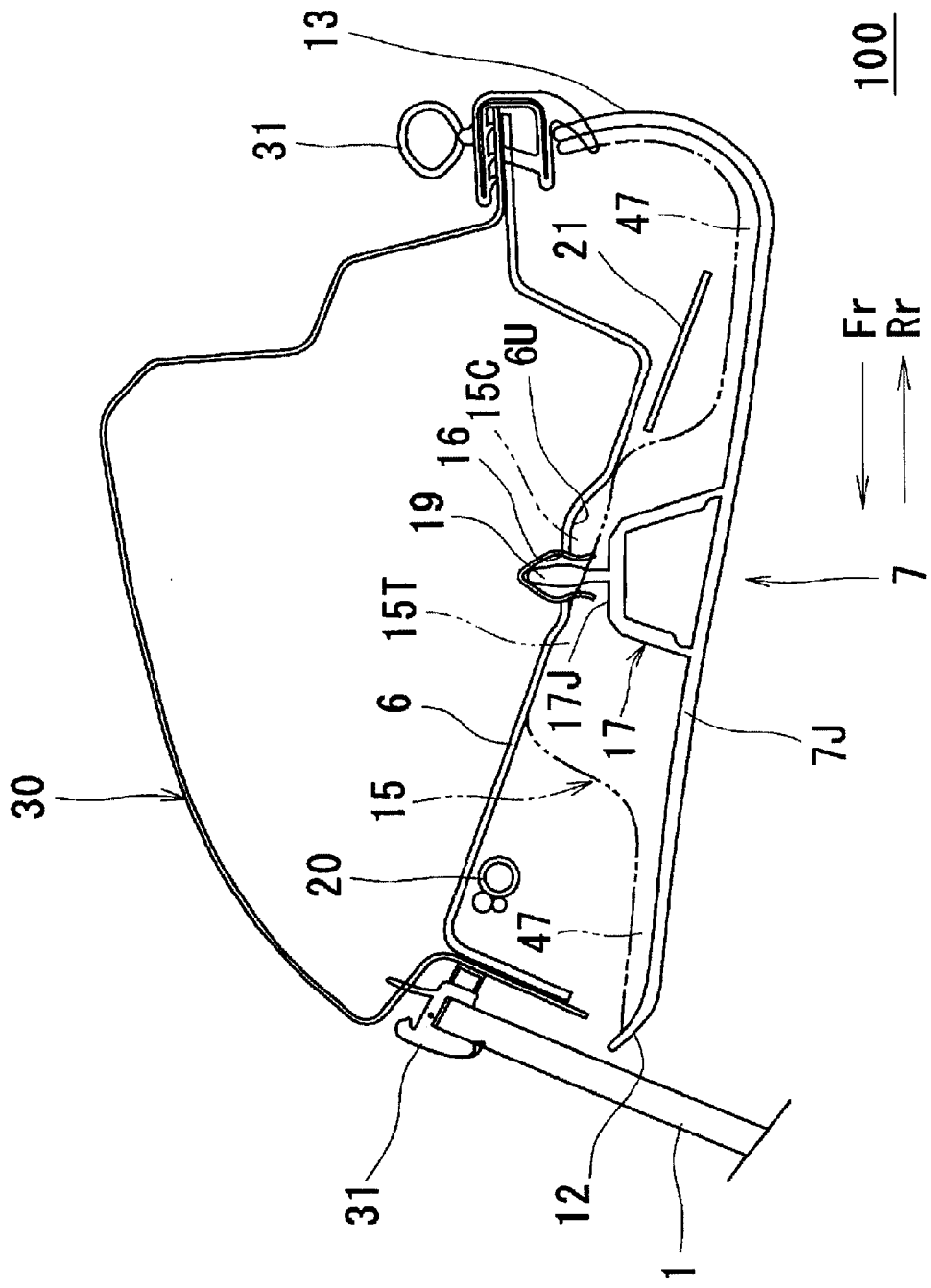
FIG. 5 is a cross-sectional view taken along the V-V line in FIG. 4.

As illustrated in FIG. 5, both side portions of the front pillar trim in terms of the front and rear direction of the car 100 are bent toward the outside of the cabin. Bent portions are a front sidewall 12 and a rear sidewall 13. As illustrated in FIG. 3 and FIG. 4, an upper end portion 71 of the front pillar trim 7 (this upper end portion 7J corresponds to an end portion of the lower interior material) and a lower end portion 9K of the connection part 9 of the roof lining 8 (this lower end portion 9K corresponds to an end portion of the upper interior material) are laid on each other in a car width direction to be connected to each other. Consequently, a parting line t is formed along a joint portion of the upper end portion 7J of the from pillar trims 7 and the lower end portion 9K of the connection part 9 of the roof lining 8 (see FIG. 3).

Further, a washer hose feeder line 20 and a tether belt 21 of a curtain airbag each corresponding to a rope-like body are disposed from a space between the front pillar trim 7 and the front pillar inner panel 6 (that is, the inside of the front pillar 3) to a space between the roof lining 8 and the roof panel 18 (that is, the inside of the roof 4).

The washer hose feeder line 20 passes through the inside of the front pillar 3 and a right side portion of the roof 4 and thus extends from a downward position of the front pillar 3 to a rear side Rr of the car 100. This washer hose feeder line 20 is fixed to the front pillar inner panel 6 via clamps 43 (see FIG. 4). The washer hose feeder line 20 feeds a washing liquid to washing liquid injection nozzles for the front window glass 1 and a back window glass 43 (see FIG. 2).

The tether belt 21 of the curtain airbag corresponding to a head protection airbag extends from a front end portion of a bag main body of the curtain airbag. A bracket 48 at a tip portion side of the tether belt 21 is fastened to a widthwise center portion of the front pillar inner panel 6 by a screw S (see FIG. 4).

Upon side collision, the bag main body is fed with gas from an inflator to be inflated and deployed downward, and the tether belt 21 is drawn out to the cabin inner side from a reverse side of the front pillar trim 7 while pulled to the rear side Rr of the car 100 by the bag main body. Consequently, the tether belt 21 is located at a positioning and acting position to hold a position of a lower end portion of the bag main body, and the bag main body inflated and deployed in a predetermined shape protects the head of a passenger.

[Structure of Projecting Piece 15]

As illustrated in FIG. 4 and FIG. 5, on a reverse surface of the lower end portion 9K of the connection part 9 of the roof lining 8, a projecting piece 15 is integrally provided. The projecting piece 15 has a trapezoidal structure in a top view and projects toward the front pillar inner panel 6. The washer hose feeder line 20 is disposed along a side portion, of the front pillar inner panel 6, located more on the front side Fr of the car 100 than the projecting piece 15 so as to be keep clear of the projecting piece 15. Further, the tether belt 21 is disposed along a side portion, of the front pillar inner panel 6, located more on the rear side Rr of the car 100 than the projecting piece 15 so as to keep clear of the projecting piece 15 (see FIG. 4).

On the reverse surface of the lower end portion 9K of the connection part 9 of the roof lining 8, the projecting piece 15 is located at a center portion in terms of a width direction of the lower end portion 9K of the connection part 9 (=the front and rear direction of the car 100). Further, both plate surfaces of the projecting piece 15 face a longitudinal direction of the washer hose feeder 20 and the tether belt 21 (that is, a longitudinal direction of the front pillar trim 7).

A projection end portion 15T of the projecting piece 15 abuts on the front pillar inner panel 6 gap between the front pillar inner panel 6 and the lower end portion 9K of the connection part 9 of the roof lining 8 is narrower on the rear side Rr of the car 100.

Further, a concave portion 6U is formed in the front pillar inner panel 6, and a convex portion 15C formed on the projecting piece 15 is fitted in the concave portion 6U. The concave portion 6U and the convex portion 15C are each formed in an arc shape in a top view. This can prevent the lower end portion 9K of the connection part 9 of the roof lining 8 from displacing in a width direction of the front pillar 3 (=the front and rear direction of the car 100) with respect to the front pillar inner panel 6.

As illustrated in FIG. 4 and FIG. 5, on the reverse surface of the lower end portion 9K of the connection part 9 of the roof lining 8, a rib 47 continuing to a base portion of the projecting piece 15 is projectingly provided along substantially the whole width of the lower end portion 9K of the connection part 9. This enables improvement in rigidity and strength of the projecting piece 15 to improve durability of the projecting piece 15. The reference 31 in FIG. 5 denotes a front door opening trim.

Further, as illustrated in FIG. 3 to FIG. 5, a clip, hole 16 is formed in the front pillar inner panel 6 below the projecting piece 15. The projecting piece 15 is in proximity to the clip hole 16 in an up and down direction. This clip hole 16 is a hole in which a clip 19 fixing the upper end portion 7J of the front pi liar trim 7 to the front pillar inner panel 6 is fitted.

As illustrated in FIG. 5, a clip seat 17 having a trapezoidal cross section bulging toward the front pillar inner panel 6 is formed on the upper end portion 7J of the front pillar trim 7, and the clip 19 projects from a seat surface 17J of the clip seat 17.

In the assembly of the car 100, the curtain airbag is first mounted on the car body panel such as the front pillar inner panel 6. Thereafter, the roof lining 8 is mounted on the roof panel 18, and thereafter the front pillar trim 7 is mounted on the front pillar inner panel 6.

According to the above-described structure, the following effects are exhibited.

(1) The projecting piece 15 projecting toward the front pillar inner panel 6 is provided on the lower end portion 9K of the connection part 9 of the roof lining 8. The washer hose feeder line 20 and the tether belt 21 are disposed to keep clear of the projecting piece 15. Therefore, the projecting piece 15 restricts the positions of the washer hose feeder line 20 and the tether belt 21.

This position restriction can prevent the lower end portion 9K of the connection part 9 of the roof lining 8 and the upper end portion 7J of the front pillar trim 7 from riding on the washer hose feeder line 20 and the tether belt 21. Accordingly, it is possible to prevent a gap from occurring at the parting portion between the lower end portion 9K of the connection part 9 of the roof lining 8 and the upper end portion 71 of the front pillar trim 7. This enables improvement in quality of outer appearance of the parting portion.

Further, as a means for the position restriction, the projecting piece 15 projecting toward the front pillar inner panel 6 only needs to be provided on the lower end portion 9K of the connection part 9 of the roof lining 8. This can simplify shaping molds of the roof lining 8 and the front pillar trim 7. Accordingly, it is possible to reduce manufacturing cost of the shaping molds.

(2) The clip hole 16 for the clip 19 fixing the upper end portion 7J of the front pillar trim 7 to the front pillar inner panel 6 is formed in the front pillar inner panel 6 below the projecting piece 15. This can prevent the washer hose feeder line 20 and the tether belt 21 from getting caught between the 19 and the clip hole 16 when the lower end portion 9K of the connection part 9 of the roof lining 8 is fixed to the front pillar inner panel 6.

(3) For example, when the front pillar trim 7 is mounted on the front pillar inner panel 6, a force Pressing the roof lining 8 toward the outside of the cabin is sometimes generated. Even in such a case, the projecting piece 15 abutting on the front pillar inner panel 6 makes it possible to prevent the lower end portion 9K of the connection part 9 of the roof lining 8 from bending. Therefore, it is possible to prevent a gap from occurring at the parting portion between the end portion of the front pillar trim 7 and the end portion of the roof lining 8.

Figure 6:
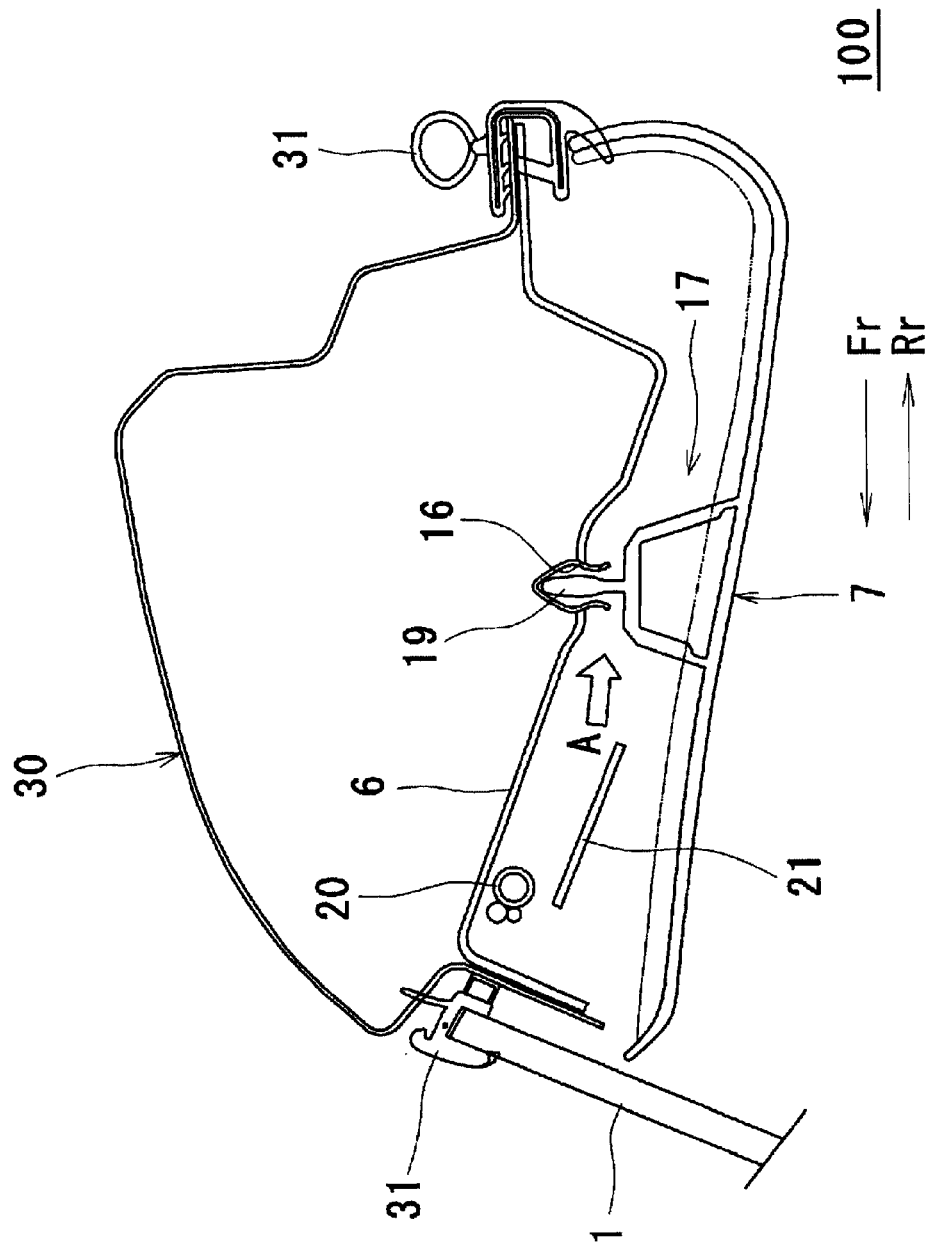
FIG. 6 is a view illustrating a comparative example and is a view corresponding to the V-V section in FIG. 4.

(4) In a comparative example illustrated in FIG. 6, the tether belt 21 is sometimes disposed, for example, more on the front side Fr of the car 100 than the clip 19 instead of being disposed along the proper place. In such a case, in the structure of the comparative example, when the curtain airbag is deployed, the tether belt 21 is pulled in an arrow A direction (the rear side Rr of the car 100) and is liable to be hooked on the clip 19.

On the other hand, according to the structure of the embodiment of the present invention, the projecting piece 15 projecting toward the front pillar inner panel 6 is provided on the lower end portion 9K of the connection part 9 of the roof lining 8, and the tether belt 21 is disposed to keep clear of the projecting piece 15. Consequently, the projecting piece 15 is capable of restricting the position of the tether belt 21. Therefore, it is possible to prevent the clip 19 from obstructing the smooth deployment of the airbag.

Other Embodiment (1) Instead of the above-described structure or in addition to the above-described structure, the projecting piece 15 may be provided on a reverse surface of the upper end portion 7J of the front pillar trim 7 so as to project toward the front pillar inner panel 6. The point is that the projecting piece 15 only needs to be provided on at least one of the roof lining 8 as the upper interior material and the front pillar trim 7 as the lower interior material.

(2) The rope-like body may be a rope-like body other than the washer hose feeder line 20 and the tether belt 21. The point is that the rope-like body may be any, provided that it is disposed from the space between the front pillar trim 7 and the front pillar inner panel 6 to the space between the roof lining 8 and the roof panel 18.

According to the present invention, it is possible to provide an interior material, mounting structure capable of improving outer appearance of a parting portion between an end portion of an upper interior material and an end portion of a lower interior material and simplifying shaping molds of the interior materials to reduce manufacturing cost of the shaping molds.

According to the present invention, the projecting piece projecting toward the car body panel is provided on the end portion of at least one interior material out of the upper interior material and the lower interior material, and the rope-like body is disposed to keep clear of the projecting piece, which enables the position restriction of the rope-like body by the projecting piece. This position restriction can prevent the end portion of the upper interior material and the end portion of the lower interior material from riding on the rope-like body and can prevent a gap from occurring at the parting portion between the end portion of the upper interior material and the end portion of the lower interior material, enabling improvement in the outer appearance of the parting portion. As a means for the position restriction, the projecting piece projecting toward the car body panel only needs to be provided on the end portion of at least one of the interior materials, which can simplify shaping molds of the interior materials to reduce manufacturing cost of the shaping molds.

According to the present invention, the projecting piece is capable of the position restriction of the rope-like body, which can prevent the rope-like body from getting caught between the clip and the clip hole when the end portion of the lower interior material is fixed to the car body panel.

According to the present invention, even if a force pressing the upper interior material (or the lower interior material) toward the outside of the cabin is generated when, for example, the lower interior material (or the upper interior material) is mounted on the car body panel, it is possible to prevent the end portion of the lower interior material (or the upper interior material) from bending, owing to the projecting piece abutting on the car body panel, which can prevent a problem that a gap is formed at the parting portion between the end portion of the lower interior material and the end portion of the upper interior material.

According to the present invention, since the convex portion formed on the projecting piece is fitted in the concave portion formed in the car body panel, it is possible to prevent the positional displacement of the upper interior material with respect to the car body panel.

If the tether belt is not disposed along the proper place, there is a possibility that the tether belt might be hooked on the clip when the curtain airbag is deployed. On the other hand, according to the present invention, the projecting piece projecting toward the car body panel is provided on the end portion of at least one of the roof lining and the front pillar trim, and the tether belt of the head protection airbag is disposed to keep clear of the projecting piece. Accordingly, the projecting piece is capable of the position restriction of the tether belt of the head protection airbag, which can prevent the clip from obstructing the smooth deployment of the airbag.

It should be noted that the above embodiments merely illustrate concrete examples of implementing the present invention, and the technical scope of the present invention is not to be construed in a restrictive manner by these embodiments. That is, the present invention may be implemented in various forms without departing from the technical spirit or main features thereof.

According to the present invention, it is possible to provide an interior material mounting structure capable of improving outer appearance of a parting portion between an end portion of an upper interior material and an end portion of a lower interior material, and capable of simplifying molds of the interior materials to reduce manufacturing cost of the molds.

What is claimed is:

1. An interior material mounting structure comprising:
   an upper interior material and a lower interior material, mounted on a car body panel,
   an end portion of the upper interior material and an end portion of the lower interior material being connected to each other;
   a rope-like body disposed from a space between the lower interior material and the car body panel to a space between the upper interior material and the car body panel;

a projecting piece provided on a center portion of the end portion of the upper interior material in a width direction of the upper interior material, to project toward the car body panel;

a projection end portion of the projecting piece provided to abut on the car body panel; and a clip hole, which accepts a clip fixing the end portion of the lower interior material to the car body panel, being formed in the car body panel below where the projection end portion of the projecting piece abuts on the car body panel, wherein the lower interior material and the car body panel form a hollow body having an open end portion over which the projecting piece provided with the upper interior material protrudes, the rope-like body and the clip hole are provided in the hollow body, and the projecting piece restricts a position of the rope-like body in relation to a position of the clip hole, in the hollow body.

2. The interior material mounting structure according to claim 1, wherein a convex portion formed on the projection end portion of the projecting piece is fitted in a concave portion formed in the car body panel.

3. The interior material mounting structure according to claim 1, wherein the upper interior material is a roof lining, wherein the lower interior material is a front pillar trim, and wherein the rope-like body is a tether belt of a head protection airbag.

4. The interior material mounting structure according to claim 1, wherein the end portion of the upper interior material comprises a joint portion at which the end portion of the upper interior material and the end portion of the lower interior material are connected to each other and laid on each other on a cabin inner side in a car width direction, and wherein the projecting piece is mounted on the joint portion.

5. An interior material mounting structure comprising:

an upper interior material and a lower interior material, mounted on a car body panel, an end portion of the upper interior material and an end portion of the lower interior material being connected to each other;

a rope-like body disposed from a space between the lower interior material and the car body panel to a space between the upper interior material and the car body panel;

a projecting piece provided on a center portion of the end portion of the upper interior material in a width direction of the upper interior material, to project toward the car body panel;

a projection end portion of the projecting piece provided to abut on the car body panel; and a clip hole, which accepts a clip fixing the end portion of the lower interior material to the car body panel, being formed in the car body panel, wherein the lower interior material and the car body panel form a hollow body having an open end portion over which the projecting piece provided with the upper interior material protrudes, the rope-like body and the clip hole are provided in the hollow body, and the projecting piece restricts the position of the rope-like body away from the clip hole.

* * * * *